United States Patent
Zachary et al.

[11] Patent Number: 6,155,282
[45] Date of Patent: Dec. 5, 2000

[54] TWO OUT OF THREE VOTING SOLENOID ARRANGEMENT

[75] Inventors: Bryan A. Zachary, Alvin; Angela E. Summers, Houston, both of Tex.

[73] Assignee: Triconex, Incorporated, Irvine, Calif.

[21] Appl. No.: 09/233,406

[22] Filed: Jan. 19, 1999

Related U.S. Application Data

[60] Provisional application No. 60/071,969, Jan. 20, 1998.

[51] Int. Cl.[7] ................................................. F16K 31/02
[52] U.S. Cl. ................................ 137/1; 137/557; 251/26; 251/30.01; 60/403
[58] Field of Search ............................. 60/403; 137/557, 137/1, 10; 251/26, 30.01

[56] References Cited

U.S. PATENT DOCUMENTS

| | | | |
|---|---|---|---|
| 2,851,047 | 9/1958 | Eller | 251/26 |
| 3,488,029 | 1/1970 | Durbin | 251/26 |
| 4,102,129 | 7/1978 | Maes | 60/403 |
| 4,316,486 | 2/1982 | Tandrup et al. | 137/625.64 |
| 4,319,609 | 3/1982 | Debrus | 137/625.69 |
| 4,637,587 | 1/1987 | Kuhnlein | 251/30.01 |
| 5,142,483 | 8/1992 | Basham et al. | 73/861.44 |
| 5,343,703 | 9/1994 | Kamimura | 60/403 |
| 5,621,164 | 4/1997 | Woodbury et al. | 73/40.5 R |
| 5,626,070 | 5/1997 | Sorbel | 91/459 |
| 5,665,898 | 9/1997 | Smith et al. | 73/1.72 |
| 5,741,166 | 4/1998 | Newman | 192/3.58 |

FOREIGN PATENT DOCUMENTS

| | | |
|---|---|---|
| 2928-005 | 2/1980 | Germany . |
| 60-11792 | 1/1985 | Japan . |

*Primary Examiner*—A. Michael Chambers
*Attorney, Agent, or Firm*—Richard L. Sampson

[57] ABSTRACT

A binary voting solenoid arrangement 10 is provided which operates in a "2 out of 3" manner to provide relatively high safety, low spurious tripping and a relatively low installation cost, while also enabling on-line testing of each solenoid individually without process interruption. Solenoid arrangement 10 is preferably manifolded (not shown), to facilitate maintenance on any detected failure, and to simplify installation and replacement.

26 Claims, 3 Drawing Sheets

TWO OUT OF THREE VOTING SOLENOID ARRANGEMENT

This application claims the benefit of Provisional application Ser. No. 60/071,969, filed Jan. 20, 1998.

BACKGROUND OF THE INVENTION

1. Field of the Invention

This invention relates to solenoid valves, and more particularly to an arrangement of solenoid valves in instrumentation and process control systems of a plant.

2. Background Information

Modern process or manufacturing plants contain innumerable operating components. These components are tied together to form systems controlled by instrumentation and control systems containing sensors and controllers. The instrumentation and control systems on such plants not only serve to control the functions of the various components in order to achieve the desired process conditions, but they also provide the facility to safely modify or discontinue the operation of all or a portion of the plant's systems in order to avoid an unsafe situation or condition.

Safety systems or configurations require routine testing in order to verify that they continue to properly perform the functions for which they were intended. From an operational and economic point of view, they also should not modify or discontinue the operation of the plant system unnecessarily. One of the means by which such safety systems function is by the securing or diverting of the supply of a certain process fluid or the supply of motive power to a plant system or component of a plant system. One of the means by which these safety functions may be accomplished is through the use of solenoid operated valves.

In operation, the solenoid valves of such systems serve to isolate and/or vent off the fluid or pneumatic source from the system when the solenoid valve changes state or position (e.g. when the valve is de-energized by switches or process monitoring sensors coupled thereto). The plant system and any system controlled thereby is then placed in a configuration designated for safety.

In many cases, the operation of individual solenoid valves may not be tested without actually tripping the system and undesirably modifying or discontinuing the operation of the plant system. Moreover, various configurations available for actuating safety shutoff valves generally require a trade-off between competing characteristics of safety and spurious trip rate.

For example, a "1 out of 2" voting solenoid valve arrangement generates a process modification (i.e. shutdown) when at least one of the two solenoids changes state. Such a configuration provides relatively high safety, with an associated relatively high spurious trip rate (i.e., a single faulty valve or sensor may generate a false trip). A "2 out of 2" voting solenoid valve arrangement requires actuation of two solenoid valves in order to trigger a modification of the plant system. This configuration has a relatively low spurious trip rate, since both solenoids must fail or otherwise change state to generate a spurious trip. However, the solenoid valves of this arrangement must be tested frequently to insure safety, since failure of only a single solenoid valve may effectively prevent the system from shutting down, etc.

Quad voting solenoids provide a balance of safety and reliability, however the quad configuration utilizes four solenoids in a relatively complex arrangement that tends to be difficult to install, test, and maintain.

Thus, there exists a need for a voting solenoid configuration which combines the features of relatively high safety with relatively low spurious trip rate and does not require the plant system to be shut down during testing.

SUMMARY OF THE INVENTION

According to an embodiment of this invention, a voting solenoid arrangement is adapted to selectively couple a fluid supply with a fluid receiver, the voting solenoid arrangement including first, second and third solenoid valves disposed in fluid communication with one another, each of the solenoid valves being alternately actuatable between first and second states so that a change of state of any two of the solenoid valves is adapted to alternately couple and de-couple the fluid supply with the fluid receiver.

Another aspect of the present invention includes a method for selectively coupling a fluid supply with a fluid receiver, the method comprising the steps of providing first, second and third solenoid valves each being alternately actuatable between first and second states; and disposing the solenoid valves in fluid communication with one another so that a change of state of any two of the solenoid valves is adapted to alternately couple and decouple the fluid supply with the fluid receiver.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figure 1:
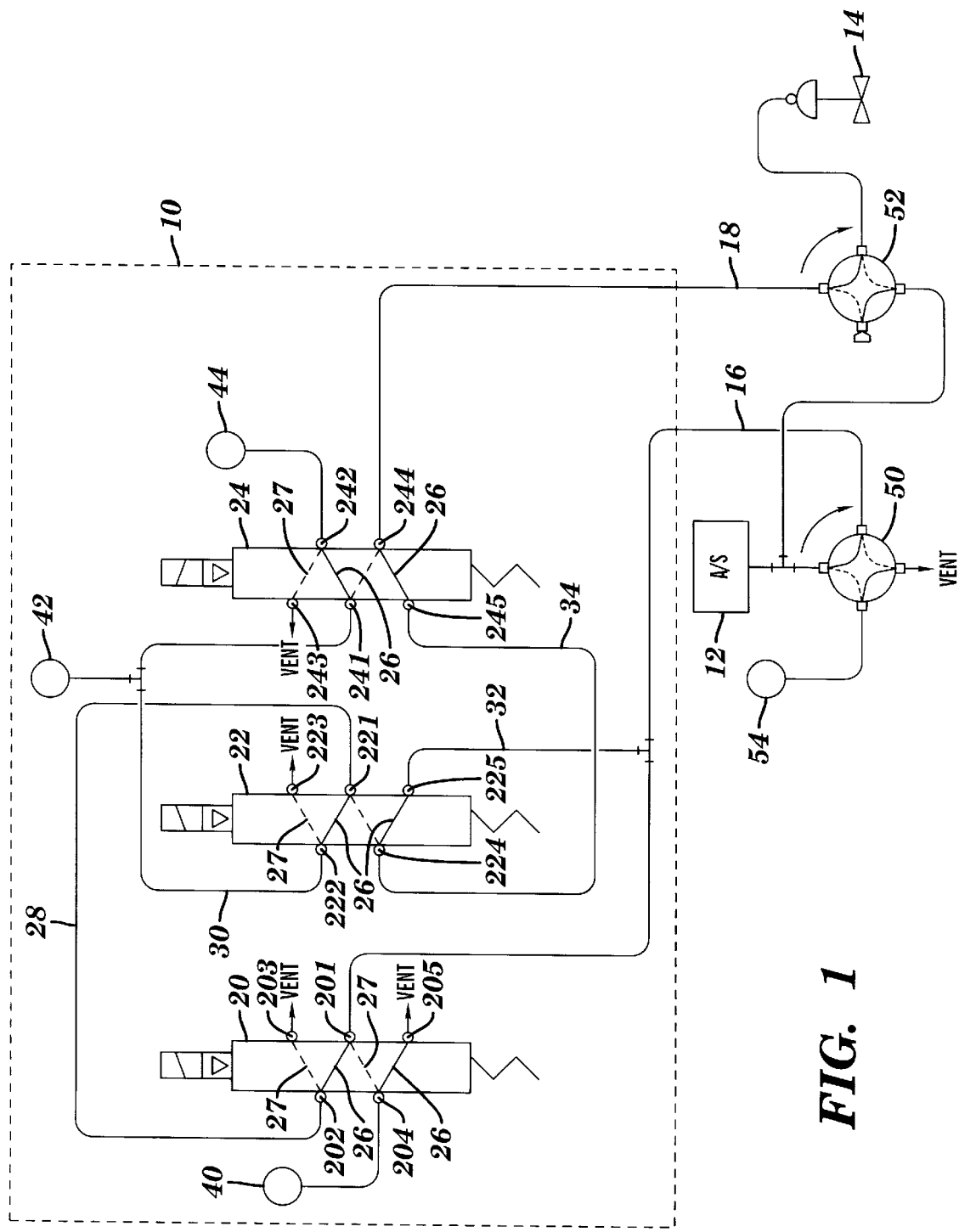
FIG. 1 is a schematic circuit diagram of a fluid safety system incorporating the solenoid arrangement of the present invention.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Referring to FIGS. 1–4, the apparatus constructed according to the principles of the present invention is shown. The present invention includes a voting solenoid arrangement 10 which operates in a "2 out of 3" manner to provide relatively high safety, low spurious tripping and a relatively low installation cost, while also enabling on-line testing of each solenoid individually without process interruption. Solenoid arrangement 10 is preferably manifolded (not shown), to facilitate maintenance on any detected failure, and to simplify installation and replacement.

Referring now to FIG. 1, the apparatus of the present invention will be more thoroughly described. As shown, the voting solenoid arrangement 10 of the present invention is adapted to selectively channel air from an air supply 12 ultimately to a valve or other fluid receiver 14. Valve 14 may be a component of a plant process, instrumentation or control system. Any suitable fluid may be utilized, such as hydraulic fluid, water, etc. In a preferred embodiment, the solenoid arrangement 10 is pneumatic. The fluid is fed from air supply 12 to solenoid arrangement 10 through conduit 16 and subsequently flows from solenoid arrangement 10 to valve 14 through conduit 18. Voting solenoid arrangement 10 includes three discreet solenoid valves 20, 22 and 24, any two of which must be actuated to start or stop air flow from conduit 16 to conduit 18. As shown, in a preferred embodiment, solenoid valves 20, 22 and 24 are bidirectional 5-port 4-way solenoid valves. These valves are thus operable with fluid flowing therethrough in either of two directions along one of two pairs of alternate pathways. For example, valve 20 includes a pair of common ports 202 and 204 which are selectively and alternately coupled with a distinct two of three other ports by alternate fluid pathways 26 and 27. As shown, in a first state (i.e., energized), pathways 26 of valve 20 couple ports 202 and 204 to ports 201 and 205. When actuated to its second (i.e. de-energized) state, pathways 27 (shown in phantom) couple the common ports 202 and 204 with ports 201 and 203. Fluid communication or coupling operation of the pathways 26 and 27 are mutually exclusive, so that when pathways 26 are open, pathways 27 are closed and vice versa.

Conduit 18 supplies air simultaneously to port 201 of valve 20 and to port 225 of solenoid valve 22. When the valves 20, 22 and 24 are in their normal or energized states, the passageways 26 are open and passageways 27 are closed. Alternatively, when the valves are disposed in their de-energized states, passageways 26 are closed and the alternate passageways 27 are open. When the valves are in their normal state air will flow from conduit 16 through port 201 of valve 20 to port 202 and to conduit 28 which in turn supplies the air to port 221 of valve 22. The air then travels through the valve 22 to port 222 and on through conduit 30 to port 241 of valve 24. Simultaneously, air from conduit 16 is fed to conduit 32, to port 225 of valve 22, through the valve to port 224, then to port 245 of valve 24 through conduit 34. The solenoid valve 24 then passes the air to port 244, to conduit 18 and ultimately to valve In the event of a change of state of any single valve 20, 22 or 24, such as in the event of a valve failure or a valve test, air will continue to pass through the solenoid arrangement 10 to the valve 14. For example, in the event solenoid valve 24 is de-energized, although air flowing through the valve from conduit 34 will be shut off, passageways 27 will open to permit air from conduit 30 to be fed from port 241 to port 244, and thus to conduit 18, to maintain air flow to valve 14. Air will only cease flowing to conduit 18 in the event one of the other solenoid valves 20 or 22 is also de-energized. In this regard, if valve 22 is de-energized in addition to valve 24, air being fed to the valve 22 at port 221 would flow to port 224 (instead of port 222) and thus through conduit 34 to port 245 of the valve 24. Since valve 24 is de-energized, passageway 26 thereof is closed and accordingly, air does not flow to conduit 18. Similarly, if both valves 20 and 24 are de-energized, air that would otherwise flow to port 241 of valve 24 from valve 22, is effectively shutoff at valve 20 due to the closing of the passageway 26 between ports 201 and 202 thereof.

In the event that only valve 22 is de-energized, air supply arriving at port 225 through conduit 32 at port 225 is effectively shut off. However, air being supplied by conduit 28 to port 221 will be shunted to port 224 and thus through conduit 34 to port 245 of valve 24, where it will be fed through the valve to conduit 18. In the event that both valve 22 and valve 20 are de-energized, the air flow to valve 22 through conduit 28 will be effectively shut off by the action of valve 20 which when de-energized, shunts the air supply at port 201 to port 204.

As also shown, a series of pressure valves 40, 42 and 43 are provided to monitor the actual state of solenoid valves 20, 22 and 24. In a preferred embodiment, pressure switch 40 is disposed in pressure sensing contact with port 204 of solenoid valve 20. Pressure switch 42 is disposed in pressure sensing contact with conduit 30 and pressure switch 44 is disposed in pressure sensing contact with port 242 of valve 24. The pressure switches 40, 42 and 44 include electrical contacts (not shown) which are alternately open and closed in response to presence and absence of pressure thereat.

In the embodiment shown, when only solenoid valve 20 is de-energized, air pressure from port 201 is shunted to port 204 which serves to open the contacts of switch 40. Simultaneously, the contacts of pressure switches 42 and 44 are opened due to lack of pressure thereat. Upon reset or energization of solenoid valve 20, the contacts of pressure switches 40, 42 and 44 return to their closed states. When only solenoid valve 22 fails or otherwise toggles to its de-energized state, pressure switches 42 and 44 sense a decrease in pressure and open their contacts. Upon reset of solenoid valve 22, the contacts of pressure switches 42 and 44 return to their closed states. When only solenoid valve 24 fails or is otherwise de-energized, pressure switch 44 registers a reduction in pressure to open the contacts thereof. Upon reset of solenoid valve 24, the contacts of pressure switch 44 return to a closed state. This operation of pressure switches 40, 42 and 44 is shown in the truth table of FIG. 2.

Figure 2:
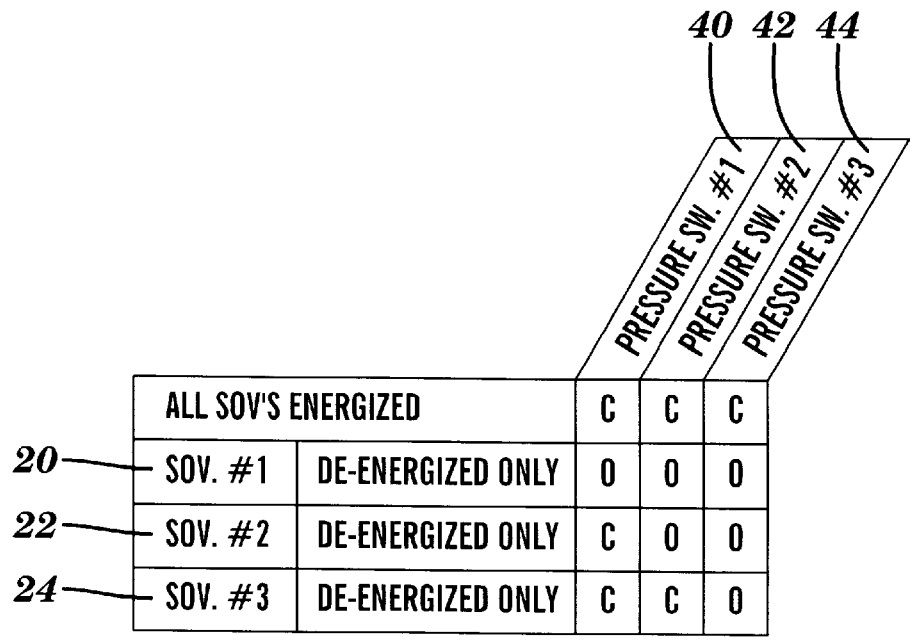
FIG. 2 is a truth table for individual actuation of the solenoids of the solenoid arrangement of FIG. 1.

The contacts of pressure switches 40, 42 and 44 may be connected to suitable circuitry such as, for example, a programmable logic controller (PLC) which may be programmed using the truth table of FIG. 2 in a manner familiar to those skilled in the art, to verify operation of each individual solenoid valve 20, 22 and 24 during testing thereof. The present invention thus advantageously enables each solenoid valve to be tested independently without disrupting fluid flow to valve 14. In this manner, the solenoid arrangement 10 may be tested frequently without disrupting plant process operation for increased safety relative to prior art configurations. In addition, safety is enhanced by effecting a cessation of fluid flow to valve 14 upon de-energization of less than a full complement of the solenoid valves 20, 22 and 24, i.e., air flow is abated once any two of the three valves changes state. This effectively permits solenoid arrangement 10 to safely stop air flow even in the event one of the valves 20, 22 and 24 fails in its energized state and becomes non-operational. Such safety is achieved while advantageously providing the low spurious trip rate typically associated with conventional 2 out of 2 voting solenoid arrangements by requiring two solenoids to change state before terminating fluid flow.

As also shown in FIG. 1 a stack selector valve including valves 50 and 52 may be used to bypass the solenoid arrangement 10 for maintenance and/or replacement thereof. As shown, valve 50 is disposed between fluid supply 12 and conduit 16 to selectively divert fluid flow from conduit 16 to a pressure switch 54. Pressure switch 54 is connected to fluid or air supply 12 upstream of valve 50, and is coupled to both conduit 18 and to valve 14 for selectively coupling air supply 12 directly to valve 14 while bypassing voting solenoid arrangement 10. Valves 50 and 52 of the stack selector valve are operable in tandem with one another between a normal position in which air flows from supply 12, through valve 50 to conduit 16, and from conduit 18 through valve 52 to valve 14 as shown, and a bypass position as shown in phantom. In the bypass position, air flow bypasses solenoid arrangement 10 and also supplies pressure to pressure switch 54 which serves to change the state of (i.e. open) the contacts thereof. Pressure switch 54 is preferably connected to monitoring and/or control circuitry such as the PLC discussed hereinabove to facilitate monitoring the position of valves 50 and 52.

As shown and described herein, solenoid valves 20, 22 and 24 are preferably disposed in their energized states during normal fluid flow through passageway 26 thereof to valve 14. This generally provides increased safety, since any interruption in power to the solenoid valves will tend to generate a change in state of the valves to stop fluid flow to valve 14. However, these solenoid valves may be disposed in their de-energized state during normal fluid flow therethrough, without departing from the spirit and scope of the present invention. Similarly, although the contacts of pressure switches 40, 42 and 44 are preferably disposed in their open states when solenoid valves 20, 22 and 24 are de-energized, any, or all of these contacts may be disposed in their closed states when the valves are de-energized, without departing from the spirit and scope of the present invention.

As also shown, in a preferred embodiment, ports 203 and 205 of valve 20, port 223 of valve 22, and port 243 of valve 24 are vented. However, these ports may be coupled to a fluid recovery system, such as in the event fluid other than air, (i.e. hydraulic fluid), is used, without departing from the spirit and scope of the invention.

Figure 4:
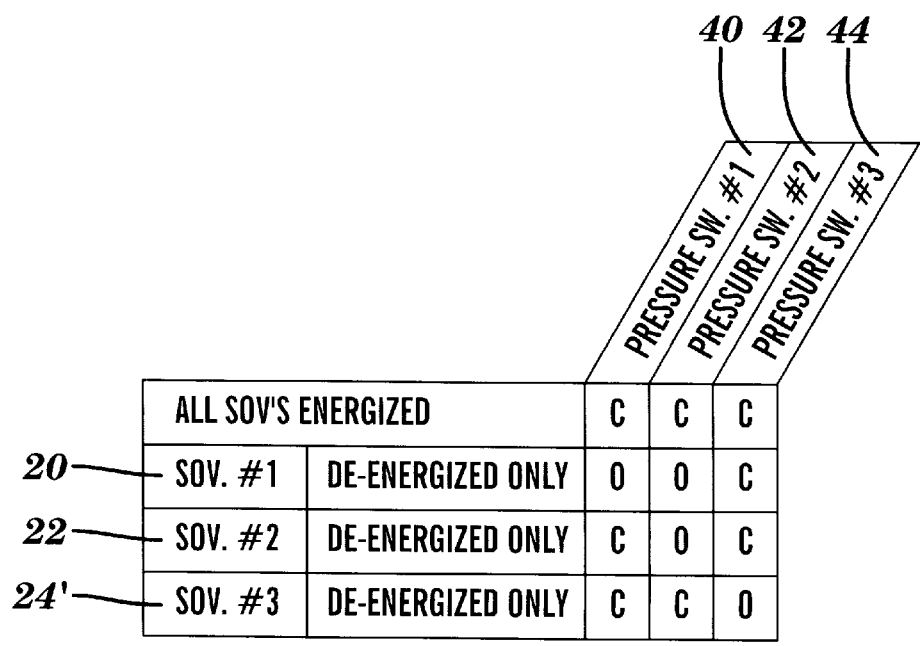
FIG. 4 is a view similar to FIG. 2, of the alternate embodiment of FIG. 3.
Figure 3:
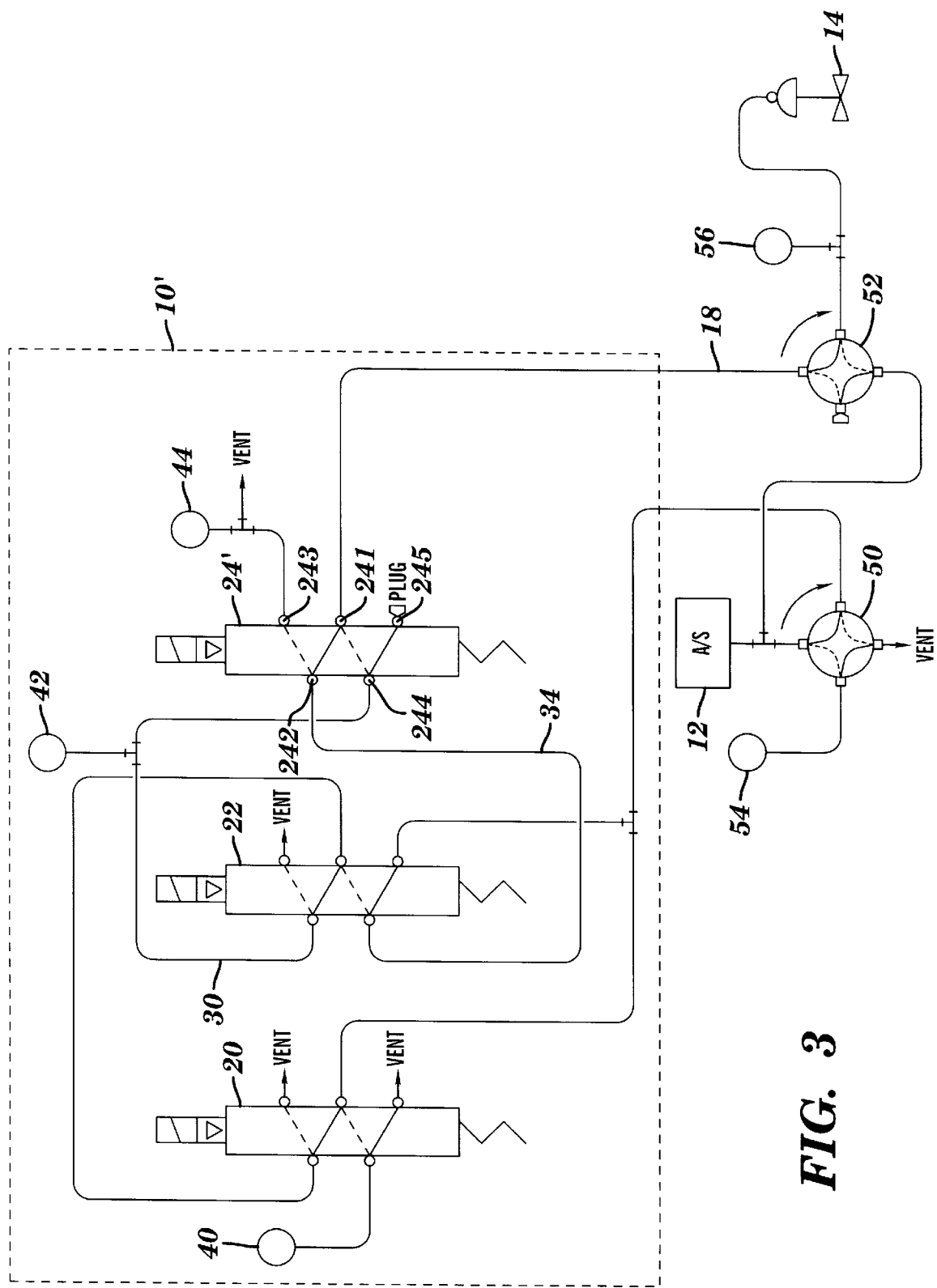
FIG. 3 is a view similar to FIG. 1, of an alternate embodiment of the present invention.

Referring now to FIGS. 3 and 4 an alternate embodiment of the present invention is shown as voting solenoid arrangement 10'. It is in many respects substantially similar or identical to solenoid arrangement 10. As shown, solenoid arrangement 10' includes solenoid valves 20 and 22 including pressure switches 40 and 42 disposed substantially as shown and described hereinabove with respect to solenoid arrangement 10. Solenoid valve 24' is substantially identical to solenoid valve 24 of FIG. 1, however as shown, valve 24' is disposed in a reverse configuration relative to valve 24. In this embodiment, conduits 30 and 34 are respectively coupled to ports 244 and 242. Similarly, pressure switch 44 and conduit 18 are respectively coupled to ports 243 and 241. In addition, rather than one of the ports (i.e. port 243 of valve 24) being vented, port 245 is plugged to prevent discharge of fluid during normal fluid flow. In this embodiment, the contacts of pressure switch 44 remain in a first state (i.e. closed) as long as solenoid valve 24' is disposed in its energized state as shown. Pressure switch 44 changes state only when solenoid valve 24' is de-energized while solenoid valves 20 and 22 remain energized. In such an event, fluid flowing through conduit 34 will be coupled to the pressure switch 44 to thereby change or open its contacts. A truth table showing the state of pressure switches 40, 42 and 44 during individual de-energization of solenoid valves 20, 22 and 24' is shown in FIG. 4. Stack selector valve including valves 50 and 52, is disposed and operated substantially as described hereinabove with respect to solenoid arrangement 10. In addition as shown, an optional pressure switch 56 may be coupled between valve 52 and valve 14 to monitor and verify flow of fluid therebetween.

The voting solenoid arrangements 10 and 10' of the present invention including the stack selector valve formed by valves 50, 52 and pressure switch 54, may be implemented in any convenient manner. For example the components thereof may be coupled to one another as shown and described herein, using suitable conduit or channel means such as tubing fabricated from a flexible polymeric material, or from a metallic, material such as steel, copper, etc. In a preferred embodiment, the solenoid valves of the present invention are disposed within a unitary manifold (not shown) which incorporates the fluid flow paths therein. The stack selector valve including valves 50 and 52 may also be disposed within the manifold if desired. Use of such a manifold, with the fluid pathways or conduits integrally disposed therein, advantageously serves to reduce installation and maintenance lost relative to than non-manifolded arrangements.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A method for selectively coupling a fluid supply with a fluid receiver, the method comprising the steps of:
   providing first, second, and third solenoid valves each having a plurality of ports and each being alternately actuatable between open and closed positions; and
   providing a plurality of inlet and outlet pathways each extending from a respective port of one of said solenoid valves to a port of another of said solenoid valves, wherein said solenoid valves are disposed in serial fluid communication with one another, a single port of one of the solenoid valves being the fluid receiver;
   wherein actuation of any two of said first, second, and third solenoid valves alternately couples and decouples the fluid supply with the fluid receiver.

2. The method of claim 1, wherein the first, second and third solenoid valves each comprise 5 port, 4-way solenoid valves having a pair of common ports which are adapted for being selectively coupled in fluid communication with three other ports, said alternate actuation including alternately coupling said pair of common ports with a distinct two of said three other ports.

3. The method of claim 2, wherein said disposing step further comprises the steps of:
   coupling the fluid supply to one of the other ports of each of the first and second solenoid valves;
   respectively coupling each of the pair of common ports of the second solenoid valve along discreet pathways with two of the three other ports of the third solenoid valve; and
   coupling one of the other ports of the third solenoid valve to the fluid receiver.

4. The method of claim 1, wherein the fluid is a gas.

5. A binary voting solenoid arrangement adapted to selectively couple a fluid supply with a fluid receiver, said voting solenoid arrangement comprising:
   first, second, and third solenoid valves each having a plurality of ports;
   a plurality of inlet and outlet pathways each extending from a respective port of one of said solenoid valves to a port of another of said solenoid valves, wherein said solenoid valves are disposed in serial fluid communication with one another;
   a single port of one of said solenoid valves being the fluid receiver;
   each of said first, second, and third solenoid valves being alternately actuatable between open and closed positions;

wherein actuation of any two of said first, second, and third solenoid valves alternately couples and decouples the fluid supply with said fluid receiver.

6. The voting solenoid arrangement of claim 5, wherein said first, second and third solenoid valves each comprise five port, four way solenoid valves.

7. The voting solenoid arrangement of claim 6, wherein said five port, four way solenoid valves further comprise a pair of common ports which are selectively coupled in fluid communication with three other ports, said alternate actuation including alternately coupling said pair of common ports with a distinct two of said three other ports.

8. The voting solenoid arrangement of claim 3, wherein at least one of said thee other ports is a vent port.

9. The voting solenoid arrangement of claim 5, wherein:
said first and second solenoid valves are each coupled in fluid communication with the fluid supply;
said second solenoid valve is coupled in fluid communication with said third solenoid valve; and
said third solenoid valve is coupled in fluid communication with the fluid receiver.

10. The voting solenoid arrangement of claim 9, wherein:
each of said first, second and third solenoid valves further comprise a plurality of upstream ports and a plurality of downstream ports;
the fluid supply is coupled to an upstream port of each of said first and second solenoid valves;
at least two of said plurality of downstream ports of said second solenoid valve are respectively coupled in fluid communication along discrete pathways with at least two of said plurality of upstream ports of said third solenoid valve; and
a downstream port of said third solenoid valve is coupled to the fluid receiver.

11. The voting solenoid arrangement of claim 10, wherein said first, second and third solenoid valves each comprise five port, four way solenoid valves having a pair of common ports which are selectively coupled in fluid communication with three other ports, said alternate actuation including alternately coupling said pair of common ports with a distinct two of said three other ports.

12. The voting solenoid arrangement of claim 11, wherein:
the fluid supply is coupled to one of said other ports of each of said first and second solenoid valves;
each of said pair of common ports of said second solenoid valve are respectively coupled along discrete pathways with two of said three other ports of said third solenoid valve; and
one of said common ports of said third solenoid valve is coupled to the fluid receiver.

13. The voting solenoid arrangement of claim 12, further comprising a bypass valve adapted to selectively couple the fluid source with the fluid receiver while bypassing said first, second and third solenoid valves.

14. The voting solenoid arrangement of claim 5, wherein the fluid comprises air.

15. The voting solenoid arrangement of claim 5, further comprising a plurality of pressure sensors operatively associated with said first, second and third solenoid valves to indicate the state thereof.

16. The voting solenoid arrangement of claim 15, wherein any one of said first, second and third solenoid valves is adapted for being disposed in said second state without de-coupling the fluid supply from the fluid receiver.

17. The voting solenoid arrangement of claim 16, wherein said plurality of pressure sensors is adapted to indicate the state of each of said first, second and third solenoid valves when the fluid supply is coupled to the fluid receiver.

18. The voting solenoid arrangement of claim 15, wherein said first, second and third solenoid valves are adapted for being individually tested without decoupling the fluid supply from the fluid receiver, said plurality of pressure sensors being adapted to indicate the state of the individual solenoid valve being tested.

19. The voting solenoid arrangement of claim 5, wherein the fluid is coupled between the fluid supply and the fluid receiver when any two of said first, second and third solenoid valves are disposed in said first state.

20. A binary voting solenoid arrangement adapted to selectively couple a fluid supply with a fluid receiver, said voting solenoid arrangement comprising:
first, second, and third solenoid valves each having a plurality of ports;
a plurality of inlet and outlet pathways each extending from a respective port of one of said solenoid valves to a port of another of said solenoid valves, wherein said solenoid valves are disposed in fluid communication with one another;
each of said first, second, and third solenoid valves having a pair of common ports and three other ports, a single port of one of said solenoid valves being the fluid receiver;
each of said first, second, and third solenoid valves being alternately actuatable between open and closed positions wherein said pair of common ports is alternately coupled with a distinct two of said three other ports;
wherein actuation of any two of said first, second, and third solenoid valves alternately couples and de-couples the fluid supply with said fluid receiver.

21. The voting solenoid arrangement of claim 20, wherein the fluid is a gas.

22. A voting solenoid valve arrangement comprising:
first, second and third solenoid actuated valves each having at least two common ports and three other ports;
said at least two common ports coupled by a normally open (NO) and a normally closed (NC) fluid passageway, respectively, to a distinct two of said three other ports;
one of said other ports of each of said first and second solenoid valves being a fluid supply port;
each of said at least two common ports of said second solenoid valve being respectively coupled along discrete pathways to discrete ones of said three other ports of said third solenoid valve; and
one of said common ports of said third solenoid valve being a fluid receiver port;
each of said first, second, and third solenoid valves being alternately actuatable between open and closed positions;
wherein actuation of any two of said first, second and third solenoid valves alternately couples and decouples one of the fluid supply ports with said fluid receiver port.

23. The voting solenoid valve arrangement of claim 22, wherein said fluid supply ports are coupled to a fluid supply, and said fluid receiver port is coupled to a fluid receiver.

24. A voting solenoid valve arrangement comprising:
first, second and third solenoid actuated valves each having at least two common ports and three other ports;

said at least two common ports coupled by a normally open (NO) and a normally closed (NC) fluid passageway, respectively, to a distinct two of said three other ports;

one of said other ports of each of said first and second solenoid valves being a fluid supply port;

each of said at least two common ports of said second solenoid valve being respectively coupled along discrete pathways to discrete ones of said common ports of said third solenoid valve; and one of said other ports of said third solenoid valve being a fluid receiver port;

each of said first, second and third solenoid valves being alternately actuatable between open and closed positions;

wherein actuation of any two of said first, second, and third solenoid valves alternately couples and decouples one of the fluid supply ports with said fluid receiver port.

25. A voting solenoid valve arrangement comprising:

first, second and third solenoid actuated valves each having at least two common ports, a junction port and first and second other ports;

one of said two common ports coupled by a normally open (NO) and a normally closed (NC) fluid passageway, respectively, to said junction port and said first other port;

an other of said two common ports coupled by a normally open (NO) and a normally closed (NC) fluid passageway, respectively, to said second other port and said junction port;

one of said first and second common ports of said second solenoid valve being coupled by a fluid pathway to said junction port of said third solenoid valve;

the other of said first and second common ports of said second solenoid valve being coupled by a fluid pathway to one of said other ports of said third solenoid valve;

said junction port of said first solenoid valve and one of said other ports of said second solenoid valve being fluid supply ports; and the one of said common ports of said third solenoid valve which is coupled to said other of said first and second common ports of said second solenoid valve being a fluid receiver port.

26. A voting solenoid valve arrangement comprising:

first, second and third solenoid actuated valves each having two common ports, a junction port and first and second other ports;

one of said two common ports coupled by a normally open (NO) and a normally closed (NC) fluid passageway, respectively, to said junction port and said first other port;

an other of said two common ports coupled by a normally open (NO) and a normally closed (NC) fluid passageway, respectively, to said second other port and said junction port;

each of said common ports of said second solenoid valve being respectively coupled along discrete pathways to discrete ones of said common ports of said third solenoid valve;

said junction port of said first solenoid valve and one of said other ports of said second solenoid valve being fluid supply ports; and said junction port of said third solenoid being a fluid receiver port.

* * * * *